United States Patent
Fradkin et al.

(10) Patent No.: US 12,072,838 B2
(45) Date of Patent: Aug. 27, 2024

(54) METHOD FOR GENERATING A COHERENT REPRESENTATION FOR AT LEAST TWO LOG FILES

(71) Applicant: Siemens Aktiengesellschaft, Munich (DE)

(72) Inventors: Dmitriy Fradkin, Wayne, PA (US); André Scholz, Ansbach (DE); Matthias Loskyll, Neumarkt (DE); Georgia Olympia Brikis, Munich (DE); Rakebul Hasan, Munich (DE); Vladimir Lavrik, Hessen (DE); Alexander Storl, Hetzles (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 79 days.

(21) Appl. No.: 17/635,203

(22) PCT Filed: Aug. 20, 2020

(86) PCT No.: PCT/EP2020/073289
§ 371 (c)(1),
(2) Date: Feb. 14, 2022

(87) PCT Pub. No.: WO2021/032820
PCT Pub. Date: Feb. 25, 2021

(65) Prior Publication Data
US 2022/0292053 A1  Sep. 15, 2022

Related U.S. Application Data

(63) Continuation of application No. 16/547,782, filed on Aug. 22, 2019, now abandoned.

(51) Int. Cl.
*G06F 16/11* (2019.01)

(52) U.S. Cl.
CPC .................. *G06F 16/116* (2019.01)

(58) Field of Classification Search
CPC ..................................... G06F 16/116
(Continued)

(56) References Cited

U.S. PATENT DOCUMENTS 5,890,154 A * 3/1999 Hsiao ............... G06F 16/00
10,528,454 B1 * 1/2020 Baraty ............ G06F 11/3684
(Continued)

FOREIGN PATENT DOCUMENTS

EP     3291120 A1    3/2018

OTHER PUBLICATIONS

Nimbalkar Piyush et al; "Semantic Interpretation of Structured Log Files"; 2016 IEEE 17th International Conference on Information Reuse and Integration (IRI); IEEE; Jul. 28, 2016; pp. 549-555; XP033027588; DOI: 10.1109/IRI.2016.81 [retrieved on Dec. 15, 2016]; Section III.
(Continued)

*Primary Examiner* — Hosain T Alam
*Assistant Examiner* — Saba Ahmed
(74) *Attorney, Agent, or Firm* — Schmeiser, Olsen & Watts LLP

(57) ABSTRACT

Provided is a computer-implemented method for receiving the at least two log files; wherein each log file of the at least two log files includes at least one log entry with at least one time stamp and at least one message; wherein the at least two log files differ from one another with respect to at least one distinctive criteria; extracting at least one additional information of each log file of the at least two log files; and combining each log file of the at least two log files with the extracted additional information into at least two processed log files; wherein the at least two processed log files comply
(Continued)

with a coherent representation. A corresponding computer program product and generating unit is also provided.

6 Claims, 5 Drawing Sheets

(58) Field of Classification Search
USPC .......................................................... 707/756
See application file for complete search history.

(56) References Cited

U.S. PATENT DOCUMENTS

| | | | |
|---|---|---|---|
| 2002/0042821 A1* | 4/2002 | Muret | H04L 41/22 709/238 |
| 2007/0220605 A1* | 9/2007 | Chien | G06F 21/552 726/23 |
| 2012/0054675 A1* | 3/2012 | Rajamannar | G06F 11/3476 715/809 |
| 2013/0097706 A1* | 4/2013 | Titonis | G06F 21/566 726/22 |
| 2015/0254158 A1* | 9/2015 | Puri | G06F 11/3476 714/37 |

OTHER PUBLICATIONS

Esser, Stefan; "Using Graph Data Structures for Event Logs"; May 20, 2019; XP055747969; DOI: 10.5281/zenodo.3333831; Retrieved from the Internet: URL:https://pure.tue.nl/ws/portalfiles/portal/126084094/Using_Graph_Data_Structures_for_ Event_Logs.pdf; [retrieved on Nov. 9, 2020] sections 2.1, 2.2.

PCT International Search Report and Written Opinion of International Searching Authority mailed Nov. 19, 2020 corresponding to PCT International Application No. PCT/EP2020/073289 filed Aug. 20, 2020.

* cited by examiner

FIG 3

Application.evt.xml

```
<ROOT DATE_CREATED="2015-08-07 08:52:35">
  <ROW>
    <Timestamp>2015-05-16 12:36:46, 000</Timestamp>
    <ComputerName>REMTEST10</ComputerName>
    <RecordNumber>231978</RecordNumber>
    <TimeGenerated>2015-05-16 12:36:46, 000</TimeGenerated>
    <EventId>80</EventId>
    <EventTypeName>Information event</EventTypeName>
    <SourceName>McAfee Solidifier</SourceName>
    <NewString />
    <SID />
    <NewMessage>'C:\windows\temp\s408.e-4104.vbs' was solidified which
  </ROW>
```

PMService.log

```
2014-09-16 15:22:41.353 PM(4328-2140) Start WinCC Project manager called.
2014-09-16 15:23:53.550 PM(3088-2452) Start WinCC Project manager called.
2014-09-16 15:23:53.597 PM(4596-4088) Start WinCC Project manager called.
2014-09-16 15:23:53.659 PM(4564-3092) Start WinCC Project manager called.
2014-09-16 15:28:29.796 PM( 568-4876) Start WinCC Project manager called.
```

WinCC_SStart01.log

```
255,25.11.2013,15:29:45;890,1007007,1,REMTEST10,SCRIPT,ProjectType 2
255,25.11.2013,15:29:46;093,1007007,1,REMTEST10,SCRIPT,vor share
255,25.11.2013,15:29:46;093,1007007,1,REMTEST10,SCRIPT,C:\Program Files\SIEMENS\WINCC\APLIB
255,25.11.2013,15:29:46;671,1007007,1,REMTEST10,SCRIPT,DM_NOTIFY_PROJECT_OPENED
255,25.11.2013,15:29:54;281,1007007,1,REMTEST10,SCRIPT,DM_NOTIFY_PROJECT_CLOSED
```

Logfile for Internal Errors: C:\Program Files (x86)\SIEMENS\WINCC\Diagnose\VerifyBhII.log

| Source | Local Time | Proc-ess ID | Thread ID | Thread Class Name | Application Module, File Version Info and Additional Error Information ... |
|---|---|---|---|---|---|
| Code | | | | | |
| Position | YYMMDD --- | ---hex--- | ---hex--- | | |
| 403131654 | | 000019FC | 00001DE0 | CInvokeThread | C:\Program Files (x86) \SIEMENS\WINCC\bin\PrintIt.exe (703.2001.119.6) NO IWinCCProtProvider Interfacepointer |
| 403131654 | | 000019FC | 00001DE0 | CInvokeThread | C:\Program Files (x86) \SIEMENS\WINCC\bin\PrintIt.exe (703.2001.119.6) NO IWinCCProtProvider Interfacepointer |

FIG 4 ipconfig-all.txt

```
Windows IP Configuration

Host Name . . . . . . . . . . . . : RemTest10
   Primary Dns Suffix . . . . . . . :
   Node Type . . . . . . . . . . . . : Unknown
   IP Routing Enabled . . . . . . . : No
   WINS Proxy Enabled . . . . . . . : No Ethernet adapter LAN Connection #1 - Terminal Bus:

Connection-specific DNS Suffix . :
   Description . . . . . . . . . . . : Broadcom NetXtreme Gigabit Ethernet
   Physical Address . . . . . . . . : 00-19-99-4C-12-F0
   DHCP Enabled . . . . . . . . . . : No
   IP Address . . . . . . . . . . . : 192.168.1.17
   Subnet Mask . . . . . . . . . . . : 255.255.255.0
   Default Gateway . . . . . . . . . :
   DNS Servers . . . . . . . . . . . : 194.138.38.86
```

SystemInfo.nfo

```
<?xml version="1.0"?>
<MsInfo>
  <Metadata>
    <Version>7.0</Version>
    <CreationUTC>08/07/15 06:50:49</CreationUTC>
  </Metadata>
  <Category name="System Summary">
    <Data>
      <Item><![CDATA[OS Name] ]></Item>
      <Value><![CDATA[Microsoft(R) Windows (R) Server 2003, Standard Edition] ]></Value>
    </Data>
    <Data>
      <Item><![CDATA[Version] ]></Item>
      <Value><![CDATA[5.2.3790 Service Pack 2 Build 3790] ]></Value>
    </Data>
    <Data>
      <Item><![CDATA[Other OS Description ] ]></Item>
      <Value><![CDATA[Not Available] ]></Value>
    </Data>
    <Data>
      <Item><![CDATA[OS Manufacturer] ]></Item>
      <Value><![CDATA[Microsoft Corporation] ]></Value>
    </Data>
    <Data>
      <Item><![CDATA[System Name] ]></Item>
      <Value><![CDATA[REMTEST10] ]></Value>
    </Data>
```

METHOD FOR GENERATING A COHERENT REPRESENTATION FOR AT LEAST TWO LOG FILES

CROSS-REFERENCE TO RELATED APPLICATIONS

This application claims priority to PCT Application No. PCT/EP2020/073289, having a filing date of Aug. 20, 2020, which claims priority to U.S. application Ser. No. 16/547,782, having a filing date of Aug. 22, 2019, the entire contents both of which are hereby incorporated by reference.

FIELD OF TECHNOLOGY

The following relates to a computer-implemented method for generating a coherent representation for at least two log files. Further, the following relates to a corresponding computer program product and generating unit.

BACKGROUND

The amount of data or data volume is still increasing until now. The data can include human- and machine-generated data. This large or voluminous data is known under the terms "big data" or "large scale data". Especially, the digital data will substantially grow in the next years in view of the digital transformation and Industry 4.0.

Thus, the importance of automated large scale data analysis or data processing will gain in importance since the manual analysis becomes unfeasible for the experts. This analysis or processing paradigm encompasses a series of different methods and systems to process big data. Big data challenges include in particular capturing data, data storage, data analysis, search, sharing, transfer, visualization, querying, updating, information privacy and data source.

Considering complex industrial plants, the industrial plants usually comprise distinct parts, modules or units with a multiplicity of individual functions. Exemplary units include sensors and actuators. The units and functions have to be controlled and regulated in an interacting manner. They are often monitored, controlled and regulated by automation systems, for example the Simatic S7 system of Siemens AG. The units can either exchange data directly with one another or communicate via a bus system with one another and with a master control unit, if the plant has such a unit. The units are connected to the bus system via parallel or, more often, serial interfaces.

A large amount of log files is generated during operation of such industrial plants. Each log file comprises one or more log entries and has a different structure or format depending on the computing unit, program or process it was generated by. Log mining tasks struggle with the variety of log file structures, formats and types that can be found in heterogenous computer systems, such as the aforementioned industrial plants. Exemplary tasks include the identification of anomalies in the log entries, comparison of the log files from one industrial plant over time, extraction of log files and/or extraction of relevant information of the log files from different industrial plants.

According to prior art, users or experts have to manually analyze the huge amount of log files and to extract the relevant information from the log files. However, such manual approaches rely on expert knowledge and require a lot of manual effort. Thus, they are error-prone, time consuming and expensive.

According to prior art, besides the manual approaches, the information extraction can be accomplished automatically with regular expressions. However, the patterns have to be defined and tested by an expert based on expert knowledge. A disadvantage is that the definition, testing and pattern matching is error prone and time-consuming.

An aspect relates to provide a computer-implemented method for generating a coherent representation for at least two log files in an efficient and reliable manner.

SUMMARY

This problem is according to one aspect of embodiments of the invention solved by computer-implemented method for generating a coherent representation for at least two log files, comprising the steps:
a. Receiving the at least two log files; wherein
b. each log file of the at least two log files comprises at least one log entry with at least one time stamp and at least one message; wherein
c. the at least two log files differ from one another with respect to at least one distinctive criteria;
d. Extracting at least one additional information of each log file of the at least two log files; and
e. Combining each log file of the at least two log files with the extracted additional information into at least two processed log files; wherein
f. the at least two processed log files comply with a coherent representation.

Accordingly, embodiments of the invention are directed to a computer-implemented method for generating a coherent representation for at least two log files. In other words, the log files comply with a coherent representation or are in accordance with a coherent representation, which can be directly used as input for further method steps or applications e.g. log mining tasks. Log mining tasks are directed to the aforementioned analysis of log files. In other words, the coherent representation can be used as input for log mining.

In a first step, the log files are provided as input. During operation, a computing unit or technical system generates a huge amount of log files, see further above. Thereby, the log files are in most of the cases of different format or type. In other words, according to this example, the distinctive criterium is the format or the type. For example, the log entry structure can vary between different types of log files i.e. those produced or generated by different programs or computing units.

Each log file of the plurality of log files comprises at least a timestamp and a message. Furthermore, each log file can comprise additional elements or information including an internal structure, indicating message code and indicators of the computing unit, technical system, subsystem or component e.g. where it was generated. According to which, in this example the additional element or information gives an indication about the origin of the log file.

In further steps this additional information is extracted from the diverse log files and incorporated into processed log files. The term extracting can be equally referred to as parsing. In other words, the log files are extended with the addition information. The incorporation or extension allows understanding the log files not only in terms of their content, but also their origin and other important data.

The processed log files are in accordance with a coherent representation. The coherent representation allows the consideration of diverse types of log files from different origins and varying structural characteristics.

In one aspect of embodiments of the invention the at least one distinctive criterium is selected from the group comprising type, format and structure. Accordingly, a log file can have one or more log entries. Thus, according to some types of log files, a log entry is exactly one line. According to other types, a log entry comprises multiple lines. Moreover, separators between log entries or between different parts of a log message of a log entry can differ from program to program. Time stamps can have different formats in different log files. Part of the timestamp e.g. date can be included in the log file name or in one of the header lines, while the remainder e.g. time is recorded for each log entry. The advantage is that the parsing or extracting step can be flexibly applied on diverse log files irrespective of any differences.

In one aspect of embodiments of the invention the additional information is an information selected from the group comprising: a computing unit which generated the log file, a program which generated the log file, configuration information of the computing unit which generated the log file, a log entry template and a connection between a log entry and the computing unit the log entry references. Accordingly, any additional auxiliary information can be incorporated.

Log Entry Template:

Usually, log entries are instances of a log entry template. This means that the message of the log entry consists partly of a fixed text and partly of dynamically generated values, thus two parts. For example, the log entry template can be expressed as "Unable to open file % s", whereas the part "Unable to open file" is the fixed part and "% s" is the variable part. The actual instances have specific file paths in the message text.

The advantage of this additionally or auxiliary information is that the information content of the log files is significantly increased.

In another aspect of embodiments of the invention the coherent representation is an input for log mining or any other analysis.

In a further aspect of embodiments of the invention the method comprises the further step of loading the coherent representation into a knowledge graph.

Accordingly, the output of the method or result in the form of the coherent representation can be used for distinct tasks. Thereby, the knowledge graph is important for diagnosis and repair of problems in an industrial environment e.g. industrial plants. In other words, the method allows the transformation of a set or collection of diverse log files from computing units or systems into a knowledge graph. Thus, the problems e.g. defects or failures of industrial plants can be handled in an efficient timely manner.

A further aspect of embodiments of the invention is a computer program product (non-transitory computer readable storage medium having instructions, which when executed by a processor, perform actions) directly loadable into an internal memory of a computer, comprising software code portions for performing the steps according to the aforementioned method when said computer program product is running on a computer.

A further aspect of embodiments of the invention is a generating unit for performing the aforementioned method.

The unit may be realized as any device, or any means, for computing, in particular for executing a software, an app, or an algorithm. For example, the generating unit may consist of or comprise a central processing unit (CPU) and/or a memory operatively connected to the CPU. The unit may also comprise an array of CPUs, an array of graphical processing units (GPUs), at least one application-specific integrated circuit (ASIC), at least one field-programmable gate array, or any combination of the foregoing. The unit may comprise at least one module which in turn may comprise software and/or hardware. Some, or even all, modules of the units may be implemented by a cloud computing platform.

BRIEF DESCRIPTION

Some of the embodiments will be described in detail, with reference to the following figures, wherein like designations denote like members, wherein:

FIG. 3 illustrates distinct log files according to an embodiment of the invention;

FIG. 4 illustrates distinct configuration files according to an embodiment of the invention.

DETAILED DESCRIPTION

Figure 1:
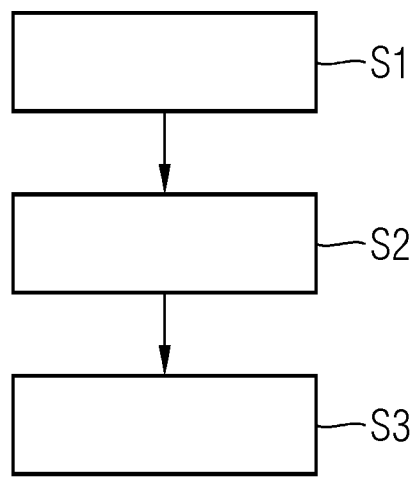
FIG. 1 illustrates a flowchart of the method according to the invention.

FIG. 1 illustrates a flowchart of the method according to embodiments of the invention with the method steps S1 to S3. The method steps S1 to S3 will be explained in the following in more detail.

In a first step the at least two log files are received S1, wherein each log file of the at least two log files comprises at least one log entry 10 with at least one time stamp 12 and at least one message 14, wherein the at least two log files differ from one another with respect to at least one distinctive criteria. These log files are depicted in FIG. 3.

In a second step at least one additional information of each log file of the at least two log files is extracted S2.

In a third step each log file of the at least two log files is combined with the extracted additional information into at least two processed log files S3, wherein the at least two processed log files comply with a coherent representation.

The method according to embodiments of the invention results in the coherent representation, which can be directly loaded used for a knowledge graph. The method can be performed by the generating unit. The generating unit can be equally referred to as universal parser or universal parsing unit.

Additional or Auxiliary Information a computing unit which generated the log file The information about the computing unit the log file was generated by can be collected.

a program which generated the log file

The information about the program the log file was generated by can be collected, in particular the name of the program that generated the log file can be extracted.

Log files generated by different computing units, programs or processes can end up in different locations i.e. along different file paths. The file paths can contain the additionally information about what computing units, programs or processes generated which log files. The algorithm is represented with the following exemplary pseudo code:

```
PARSELOGFILE(filepath):
    logFile = openRead(filepath)
        logEntries = [ ]
    while NOT logFile.endOfFile( )
        line = logFile.readLine( )
        num =+ 1
        buffer = ""
        ts = ""
        if findTimestamp(line):
            buffer += line
        else:
            logEntries.append(buffer, ts)
            ts = findTimestamp(line)
            buffer = splitString(line, ts)
    endwhile
    logFile.close( )
    return logEntries
function splitString(l, ts)
    pos = l.find(ts) + ts.lenght
    return l[pos:]
endfunction
function findTimestamp(l)
    // Set of regular expressions specifying
    // different formats of timestamps
    tsRegExList
    for regEx in tsRegExList
        if regEx.match(l):
            return regEx.match(l)
        else
            return 0
endfunction
```

Accordingly, the paths of the log files can be extracted to identify the computing unit, program or process that generated the respective log file. Different programs tend to write their log files into separate locations and data from different compute units is likely to be dumped separately. Thus, the specific log entries can be associated with the respective computing unit, program or process.

configuration information of the computing unit which generated the log file

The device configuration information can be collected, e.g. values of configuration settings in the log entries. Further, certain log files can be linked to the computing units, program or process that generated them.

For example, the configuration information or file of a program might specify where the log files will be written or set flags for certain behaviors. These configuration files are depicted in FIG. 4.

a log entry template

The templates of the underlying structure that log entry messages have can be collected.

Accordingly, log files from large distributed systems can reflect the system structure:

There can be multiple computing units of different types or fulfilling different roles e.g. servers and clients or embedded systems, but running same or similar software programs. Thus, the log file dumps from each such a computing unit contain same or similar types of log files. Further, computing units generating different types of log entries likely have different functions.

Moreover, the log entry messages can comprise information about network organization e.g. by mentioning names or IP addresses or different computers.

An exemplary log file dump or snapshot can be expressed as follows:

PlantX/ComputerY/file_path_for_programZ/logs (or settings/config files)

The log entry template can be determined by clustering or grouping the message texts and identification of invariant parts. Thereby, the variable parts are the template parameters and the messages with the same fixed parts are generated from the same templates.

Having identified the log entry templates, the multi-language versions of the same template can be identified as well since they are generated by the same computing unit, program or process and thus have the same number or parameters. This semantic verification can be performed manually or automatically with automated translators.

a connection between a log entry and the computing unit the log entry references The interconnections between log entries and computing units or devices they reference can be collected as well. Accordingly, the log entry messages can be used to identify cross-reference computer names and IP addresses.

Knowledge Graph

Figure 2:
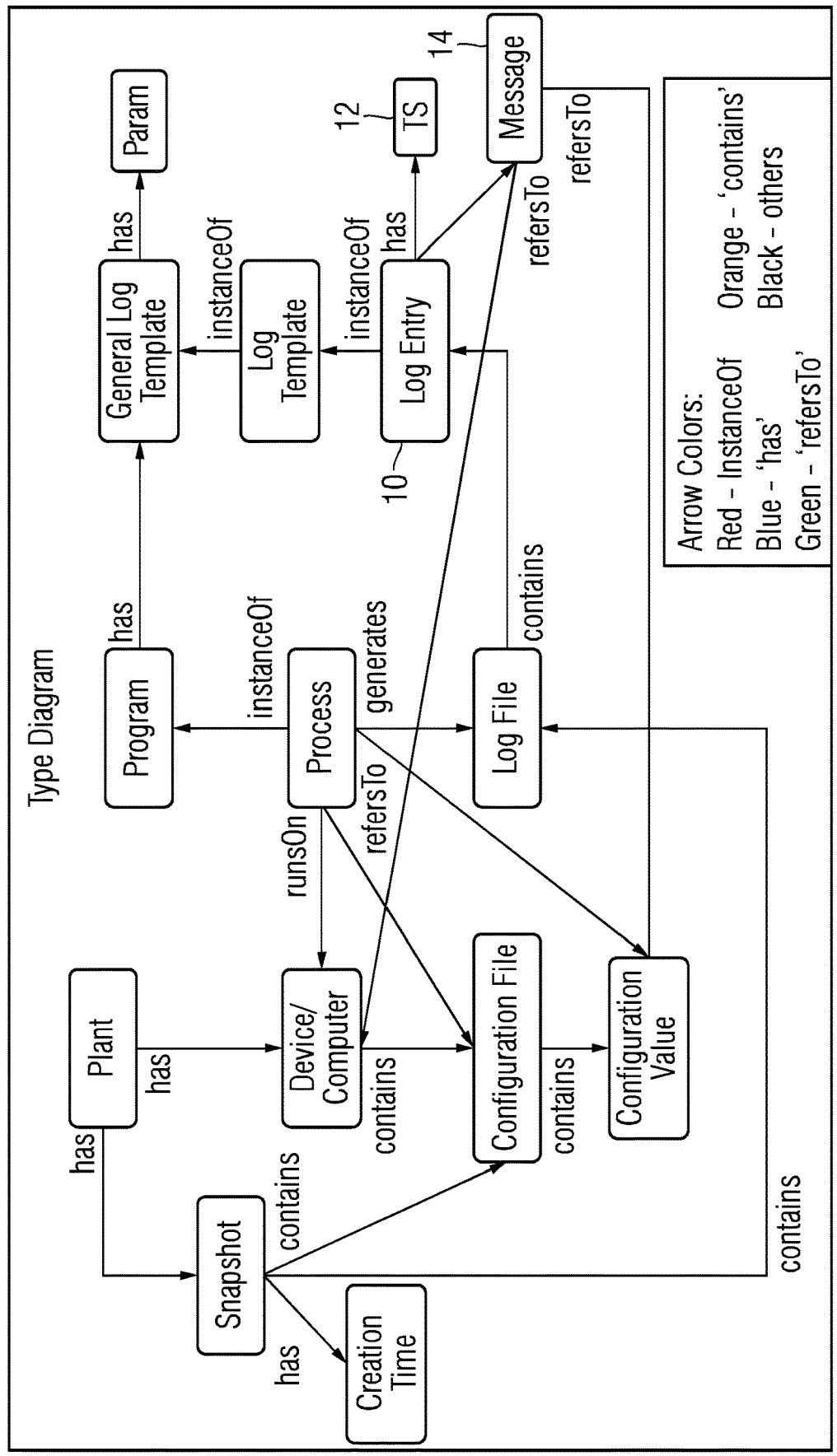
FIG. 2 illustrates an exemplary knowledge graph according to an embodiment of the invention.

The output can be loaded into a knowledge graph, as explained further above. An exemplary knowledge graph is shown in FIG. 2, comprising the following entities and relations:

A Plant consists of multiple devices

Some devices have computers in order to perform computations

A process is an instance of a program running on a computer

A program can have multiple General Log Templates (GLT)

Each GLT has a message template with several parameters

A log template is a language-specific version of a GLT

A log entry 10 is an instantiation of a log template

A log entry 10 has a timestamp 12 (TS)

A log entry 10 has a message text 14—template with parameters filled

A log entry is contained in a log file (LF) and produced by a Process and is therefore linked to computing unit A computing unit or computer is referenced by a log entry in a message A configuration file (CF) on a computing unit can have multiple configuration values (CV) affecting the whole computing unit or specific processes A configuration value can be directly referenced by a log entry message or can have indirect relevance A plant can have multiple Snapshots generated at different points in time Exemplary Applications At present time most of the operation and control of industrial equipment is managed by standard or special control software. Humans may be frequently engaged in a monitoring capacity, but only get involved in problem situations. However, when such situations arise it may be nontrivial to identify causes and potential solutions. The main way to get insight into operations of such computer-controlled systems is by examining information from relevant log files. This task is performed manually by experienced service technicians making it time-consuming and not always as accurate as needed.

The knowledge graph provides the users e.g. experts and service technicians an organized view of the log file data.

Figure 5:
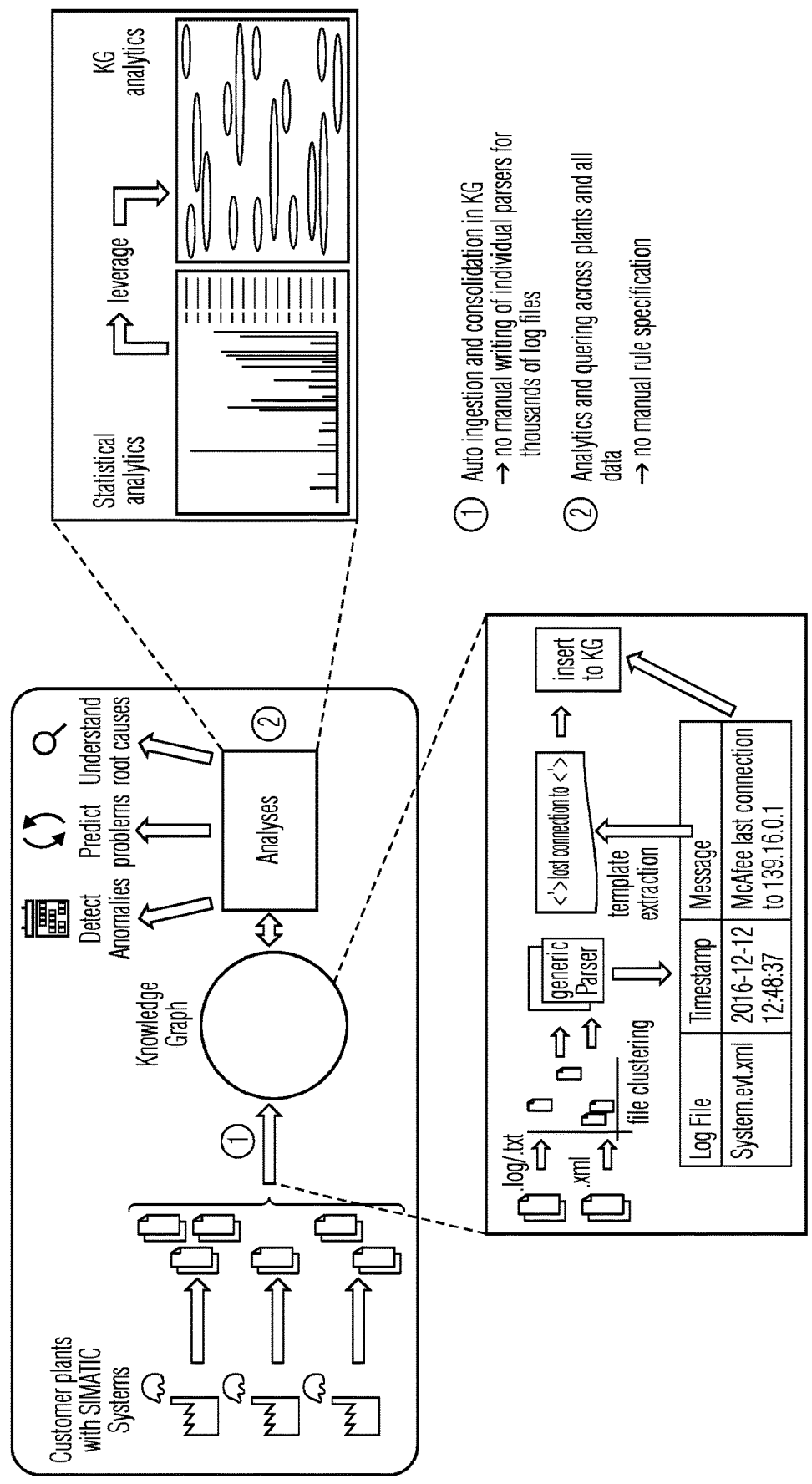
FIG. 5 illustrates an exemplary use case of the method according to the invention.

An exemplary use case is shown in FIG. 5. The log files can be collected from different customer plants with SIMATIC systems. The knowledge extraction process is described by the bottom part of the figure.

In a first step the log files are clustered. Log messages and time stamps are extracted by generic parsers. The messages can be used to extract templates. Further, the content of messages can be extracted. All information is inserted into a knowledge graph for further analysis according to the right part of the figure, like anomaly detection, failure prediction and root cause understanding by a combination of statistical and knowledge graph analytics.

Considering industrial applications and environments, the data can refer to

Power plants. The power plants can have multiple turbines and other pieces of equipment.

Modern factories. The factories can have multiple interacting automated tools.

Trains. The trains can have multiple semi-autonomous systems, for example for door control, climate control and for movement.

Medical equipment. The equipment can have separate controllers for operating different movable parts e.g. the patient bed or the scanning tools and the devices e.g. MRT for imaging and data collection.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

REFERENCE SIGNS

S1 to S3 Method steps 1 to 3
10 log entry
12 time stamp (TS) of log entry
14 message of log entry

The invention claimed is:

1. A computer-implemented method comprising:
receiving, by one or more processors of a computing system, at least two diverse log files each having varying structural characteristics, wherein each log file of the at least two diverse log files comprises at least one log entry with at least one time stamp and at least one message, and the at least two diverse log files differ from one another with respect to at least one distinctive criteria;
extracting, by the one or more processors, file paths of each log file to identify a computing unit which generated the log file, a program which generated the log file, and configuration information of the computing unit which generated the log file;
clustering, by the one or more processors, the at least one message of each log file for extracting a content of the at least one message, and for extracting invariable parts and variable parts of the at least one message to determine a log entry template;
combining, by the one or more processors, each log file of the at least two diverse log files with the at least one time stamp, the content of the at least one message, the computing unit which generated the log file, the program which generated the log file, the configuration information of the computing unit which generated the log file, and the log entry template into at least two processed log files, wherein the at least two processed log files comply with a coherent representation;
loading, by the one or more processors, the coherent representation of the at least two processed log files into a knowledge graph such that the at least two diverse log files are transformed into the knowledge graph; and
performing a combination of statistical and knowledge graph analytics using the knowledge graph for diagnosis and repair of problems in an industrial environment.

2. The method according to claim 1, wherein the at least one distinctive criteria is selected from the group comprising:
a type, a format and a structure.

3. The method according to claim 1, further comprising:
establishing, by the one or more processors, a connection between a log entry and the computing unit the log entry references.

4. The method according to claim 1, wherein the coherent representation is an input for log mining or any other further analysis.

5. A computer program product, comprising a computer readable hardware storage device having computer readable program code stored therein, said program code executable by a processor of a computer system to implement a method according to claim 1 when the computer program product is running on a computer.

6. A computing system comprising:
one or more processors; and
a memory operatively connected to the one or more processors;
a computer readable storage device coupled to the processor, wherein the storage device contains program code executable by the processor via the memory device to implement a method comprising:
receiving, by the one or more processors, the at least two diverse log files each having varying structural characteristics, wherein each log file of the at least two diverse log files comprises at least one log entry with at least one time stamp and at least one message, and the at least two diverse log files differ from one another with respect to at least one distinctive criteria;
extracting, by the one or more processors, file paths of each log file to identify a computing unit which generated the log file, a program which generated the log file, and configuration information of the computing unit which generated the log file;
clustering, by the one or more processors, the at least one message of each log file for extracting a content of the at least one message, and for extracting invariable parts and variable parts of the at least one message to determine a log entry template;
combining, by the one or more processors, each log file of the at least two diverse log files with the at least one time stamp, the content of the at least one message, the computing unit which generated the log file, the program which generated the log file, the configuration information of the computing unit which generated the log file, and the log entry template into at least two processed log files, wherein the at least two processed log files comply with a coherent representation;
loading, by the one or more processors, the coherent representation of the at least two processed log files into a knowledge graph such that the at least two diverse log files are transformed into the knowledge graph; and performing a combination of statistical and knowledge graph analytics using the knowledge graph for diagnosis and repair of problems in an industrial environment.

\* \* \* \* \*